United States Patent [19]

Conway

[11] Patent Number: 5,422,685
[45] Date of Patent: Jun. 6, 1995

[54] DUAL TEMPLE SYSTEM FOR EYEWEAR

[75] Inventor: Simon M. Conway, Lima, N.Y.

[73] Assignee: Bausch & Lomb Incorporated, Rochester, N.Y.

[21] Appl. No.: 47,735

[22] Filed: Apr. 15, 1993

[51] Int. Cl.$^6$ .......................... G02C 5/14; G02C 5/20
[52] U.S. Cl. .................................. 351/114; 351/111; 351/123
[58] Field of Search ............... 351/111, 113, 114, 115, 351/116, 118, 119, 123

[56] References Cited

U.S. PATENT DOCUMENTS

| | | | |
|---|---|---|---|
| 444,505 | 1/1891 | Price | 351/118 |
| 509,967 | 12/1893 | Sumner | 351/119 |
| 569,462 | 10/1896 | Meredith | 351/111 |
| 1,636,740 | 7/1927 | Hickey | 351/123 |
| 1,833,792 | 11/1931 | Pfaus et al. | 351/111 |
| 2,172,959 | 9/1939 | Hirtenstein | 2/13 |
| 2,229,568 | 1/1941 | Hodgkins | 351/123 |
| 3,018,687 | 1/1962 | Sadel | 351/113 |
| 3,055,267 | 9/1962 | Catt | 351/111 |
| 4,012,130 | 3/1977 | Guillet | 351/114 |
| 4,655,564 | 4/1987 | Czech | 351/111 |
| 4,790,645 | 12/1988 | Gish | 351/119 |
| 4,844,605 | 7/1989 | Peterson et al. | 351/123 |
| 4,932,772 | 6/1990 | Stanley et al. | 351/115 |
| 4,978,209 | 12/1990 | Ohba | 351/113 |

FOREIGN PATENT DOCUMENTS

| | | | |
|---|---|---|---|
| 2688073 | 9/1993 | France | |
| 326111 | 3/1930 | United Kingdom | 351/114 |

Primary Examiner—Anita Pellman Gross
Assistant Examiner—David R. Parsons
Attorney, Agent, or Firm—John E. Thomas; Salvatore P. Pace

[57] ABSTRACT

The present invention provides a dual temple system, useful in eyewear frames, having in combination a paddle temple member and a cable temple member. Eyewear frames having a pair of dual temple systems are also provided.

15 Claims, 2 Drawing Sheets

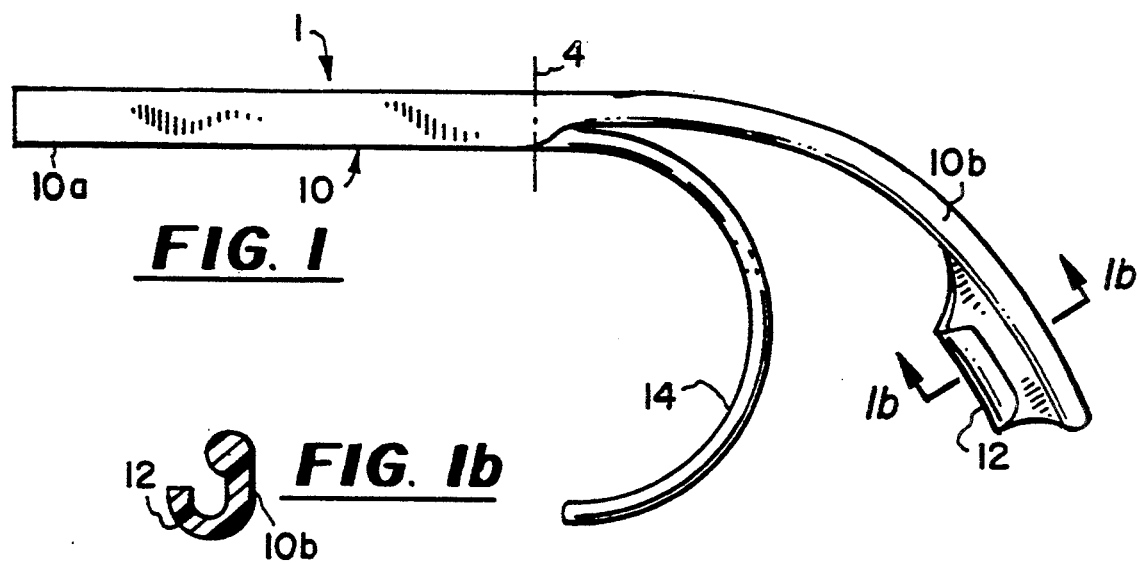
FIG. 1
FIG. 1b
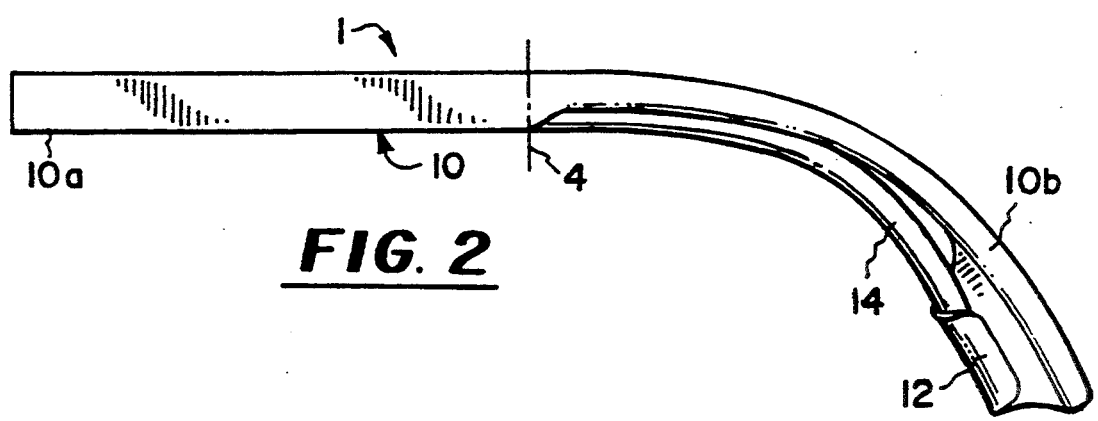
FIG. 2
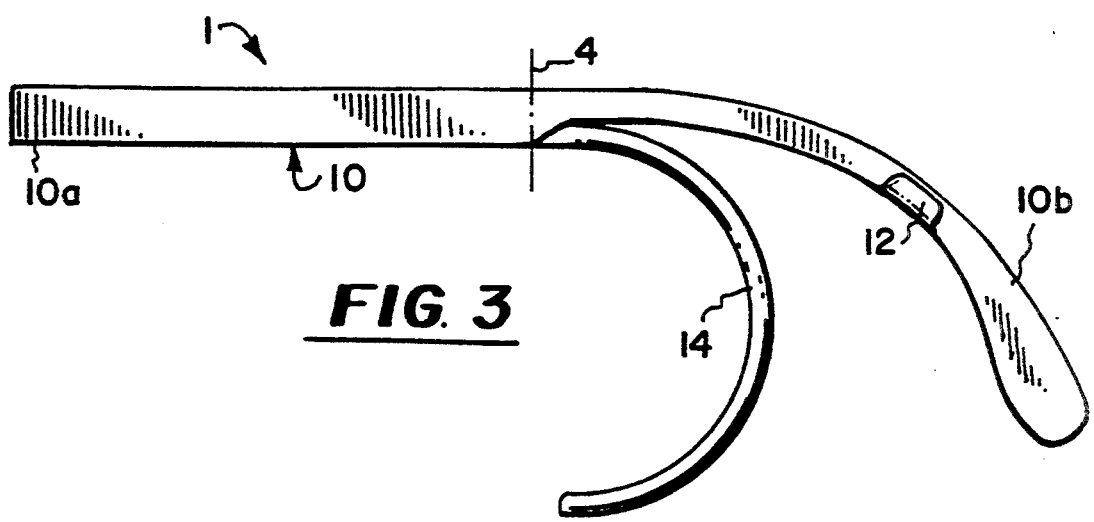
FIG. 3

DUAL TEMPLE SYSTEM FOR EYEWEAR

BACKGROUND OF THE INVENTION

1. Field of the Invention

The present invention relates to a new temple system useful in eyewear frames, and more particularly, relates to a dual temple system having in combination a paddle temple member and a cable temple member.

2. Description of the Art

Eyewear, such as sunglasses or spectacles, typically comprise a front frame, temple members which extend out and over the ear of the wearer, and hinge systems for attaching the temples to the front frames. Conventionally, there are two broad classes of temple types. The first type, generally known as a paddle temple, has a partially flattened outer end appropriate for extending over and behind the ear and along the side of the head of the wearer. While the outer end usually has a curvature to hug the top edge of the ear, these temples do not securely attach the temple to the ear and the eyewear to the head. During brisk movement, such as any sports activity, the eyewear can easily be dislodged or thrown from the head. Thus, eyewear containing paddle temples have not been found to be satisfactory when worn during excessive movement such as sports activities.

To overcome the short falls of paddles temples on eyewear worn during sports activities, accessories such as elastic bands or straps have been developed. These accessories are typically connected to the outer end of each paddle temple to firmly wrap around the back of the head. Further, modifications have also been developed in the hinge mechanism to allow the temples to more securely hug the side of the wearer's head. However, neither of these solutions have proved to be entirely satisfactory due primarily to the discomfort associated with these approaches and the difficulty associated with the placement and removal of the eyewear from the wearer's head.

A second general type of temple, known as a cable temple, has a spring-like flexible stranded member which is shaped so as to pass around and grip the ear. These cable temples grip the back of the ear from a point above the ear to a point below the ear and firmly attach the temple and the eyewear to the wearer's head. The cable temple typically comprises a flexible metal core which is wrapped in a protective material to protect the wearer's ear. However, the prolonged attachment of the cable temple to the wearer's ear has been found to be generally uncomfortable because of the tight grip of the cable temple against the ears of the wearer.

The present invention comprises a temple system which contains both a paddle temple member and a cable temple member which can be easily and simply changed from one member to the other at the option of the wearer. While other attempts have been made to combine multiple temple elements, many of these prior approaches require retractable systems wherein the cable temple member of the temple system is retracted or moved from the ear using a mechanical means. Further, other complex mechanical systems have been developed for changing from one temple type to the other. However, these temple systems tend to be complex, costly to manufacture, and difficult for the wearer to use.

U.S. Pat. No. 4,012,130 discloses an improved frame for eyeglasses in which the frame comprises a temple member having a rigid ear piece near its outer end and having a flexible stranded ear piece member along its lower edge which can be retracted into the rigid member. According to one embodiment of this patent, the inner end of the flexible stranded ear piece is made to follow the same general contour as the rigid ear piece member by a mechanism which engages the end of the flexible stranded ear piece member into a slot in the bottom of the outer end of the rigid ear piece member. However, this temple system has several drawbacks. First, the slot means for attaching the flexible member to the rigid member is inherently in conflict with the spring-like shape and action of the flexible member. When the flexible member is attached to the slot of the rigid member and forced to conform to the shape of the rigid member, the force on the flexible member continually pulls away from the rigid member resulting in the flexible member releasing from the rigid member. Conversely, if the slot is adapted to firmly receive the flexible member in a manner to force the flexible member to conform to the shape of the rigid member (to avoid this release problem), the slot attachment will be difficult to use and the shape of the flexible member will eventually be modified. This modification will result in the flexible member not providing the fit originally desired becoming loose or uncomfortable.

The present invention overcomes these shortcomings by a simple and efficient means which allows the cable temple member to be easily moved and secured away from the ear and yet does not force the cable member into a substantially disforming position. Further, the present invention can be easily and cost effectively manufactured and allows the wearer to simply remove the cable temple member from the ear without removing the eyewear from the head.

SUMMARY OF THE INVENTION

An eyewear temple system is provided comprising a substantially rigid paddle temple member having an inner end for attachment to an eyewear front frame and an outer end proximate to said inner end passing over the ear of the wearer and extending behind the ear and having a cradle between the inner end and the outer end, and a flexible cable temple member affixed to the paddle temple member between the inner end and the cradle and having a generally arcuate shape for gripping the ear when in a first position, whereby the cable temple member can be moved from the first position to a second position which does not contact the ear by placing the cable temple member into the cradle.

Also provided herein is an eyewear frame containing a pair of eyewear temple systems of the present invention.

BRIEF DESCRIPTION OF THE DRAWINGS

FIG. 1 is a side view of one embodiment of the dual temple system wherein the cable temple member is in a first position;

FIG. 1b is a sectional view taken along line 1b—1b of FIG. 1;

FIG. 2 is a side view of the dual temple system of FIG. 1 wherein the cable temple member is in a second position;

FIG. 3 is a side view of another embodiment of the dual temple system wherein the cable temple member is in the first position;

DETAILED DESCRIPTION OF THE INVENTION

Figure 4:
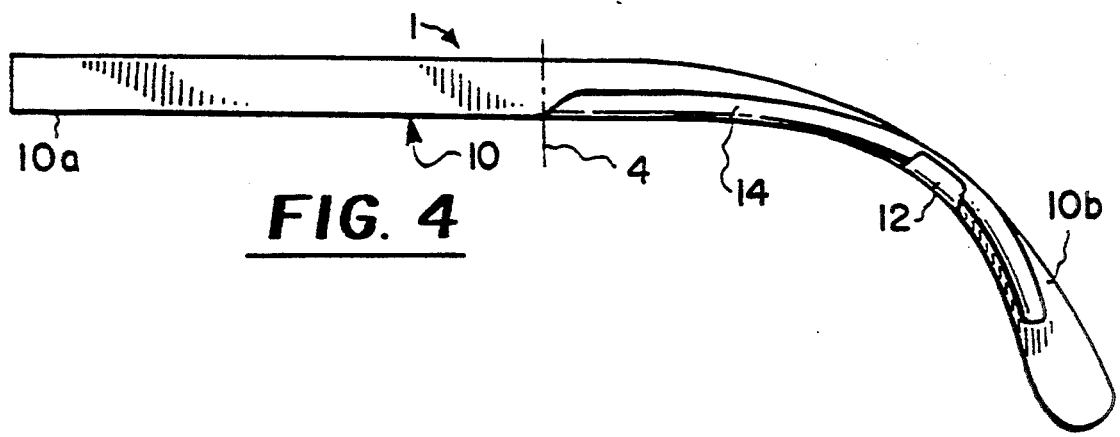
FIG. 4 is a side view of the dual temple system of FIG. 3 wherein the cable temple member is in a second position.

Referring now to FIGS. 1-4, the drawings illustrate the side view of the dual temple system 1 of the present invention viewing the outer face of the dual temple system 1 (the face positioned away from the wearer's head). The dual temple system 1 comprises a paddle temple member 10 having an inner end 10a for attachment to a front frame and an outer end 10b located opposite and proximate the inner end 10a. The inner end 10a can be attached to a front frame having means for holding either a pair of lenses or a single lens through any suitable attachment means (not shown) such as a conventional hinge. The outer end 10b has the general form of a flattened ear piece intended to extend over the top of the ear of the wearer and continue to a point behind the ear. Typically, the flattened ear piece will be curved downwardly beginning at a point near its contact point with the ear and continues to the outer end 10b which extends behind the ear. Although paddle temple member 10 is shown with a conventional substantially "straight" configuration, paddle temple member 10 can include other shapes such as a "V" shaped or "U" shaped configuration between inner end 10a and outer end 10b.

Paddle temple member 10 is made of any substantially rigid or partially rigid material useful for eyewear temples such as metal or plastic, or as discussed below can be of both such materials. Preferably, paddle temple member 10 will be made from moldable materials such as polyamides; polycarbonates; celluloses such as acetates, butyrates, and proprionates or similar polymers or copolymers.

Cable temple member 14 is securely attached to paddle temple member 10 at a point intermediate to inner end 10a and outer end 10b. For convenience, a central axis 4 illustrates a suitable position for attachment of cable temple member 14 although other positions for attachment can be used depending on the specific design of the paddle temple member. Depending on the shape of paddle temple member 10, cable temple member 14 can be attached at any suitable location between inner end 10a and outer end 10b which best accomplishes the attachment of cable temple member 14 to the ear of the wearer. It is preferred herein that the cable temple member 14 be positioned below or under paddle temple member 10.

Cable temple member 14 can be made of any conventional flexible material such as a wound metal assembly or a suitable molded plastic but is preferably a multiplicity of nickel, copper or steel (or alloys) wire strands wound to provide the desired flexibility and strength and, optionally, encased in a protective coating such as a plastic or fabric sheath. Such temple materials are well known in the art. Although cable temple member 14 can be removably attached to paddle temple member 10, preferably, cable temple member 14 is permanently affixed to or integrally molded to paddle temple member 10.

Located on the outside face of cable temple 10 (the side facing away from the wearer's head) is a securing means described herein as a cradle 12 positioned between central axis 4 and outer end 10b. As best illustrated in FIG. 1b, cradle 12 has a generally "U" shaped configuration defining a recess intended to receive cable temple member 14 by placing cable temple member 14 into the recess as best shown in FIG. 2. A shelf or lip (not shown) may be formed or attached to the free side of the "U" shape in order to aid in maintaining the cable temple member within the recess. Cradle 12 may also be designed to snugly fit cable temple member 14 by a suitable friction connection.

While cradle 12 is shown in FIGS. 1-4 with an open end of the cradle facing upward (towards the top or back of the head of the wearer), the cradle can also be positioned with the open end facing outward (away from the head of the wearer). Other modifications to cradle 12 can be made as are evident to those skilled in the art.

Although cradle 12 can be attached to paddle temple member 10 by any suitable means, preferably, paddle temple member 10 will be integrally molded to include cradle 12 in the embodiments shown in FIGS. 1-4. Cradle 12 can be located on the "paddle" portion of the paddle temple member 10 (FIG. 1) or can be located at other positions on paddle temple member 10 (FIG. 3). Alternatively, cradle 12 can be a separate piece which snaps or otherwise attaches to paddle temple member 10 (not shown).

Figure 5:
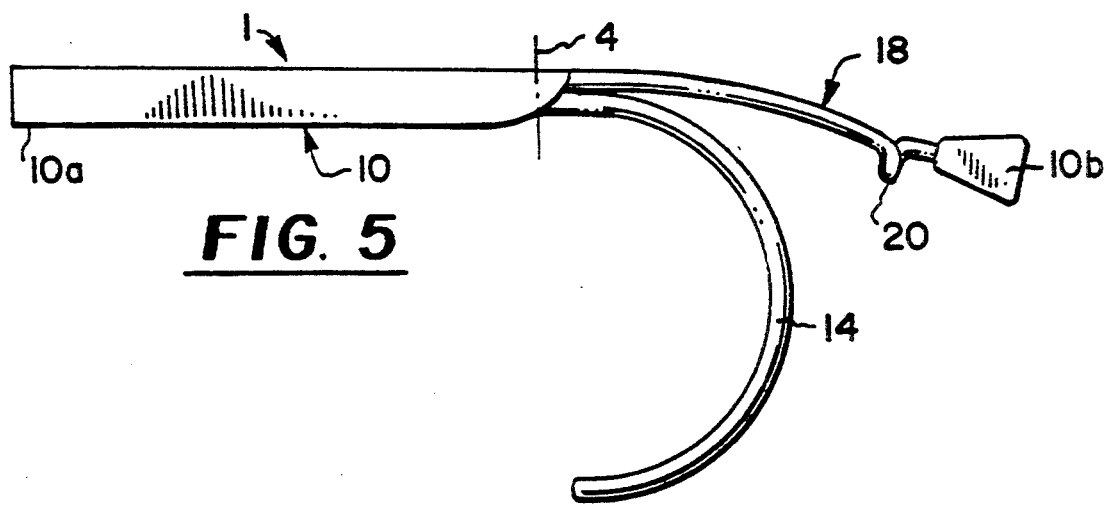
FIG. 5 is a side view of another embodiment of the dual temple system wherein the cable temple member is in the first position.
Figure 6:
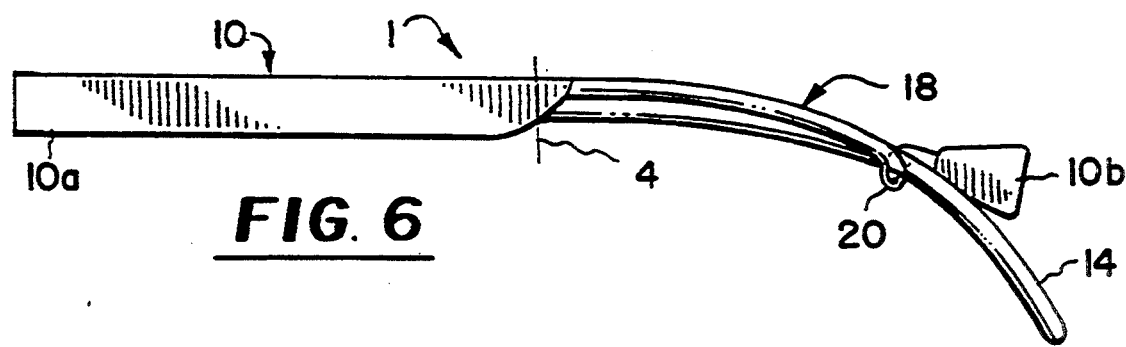
FIG. 6 is a side view of the dual temple system of FIG. 5 wherein the cable temple member is in a second position.
Figure 7:
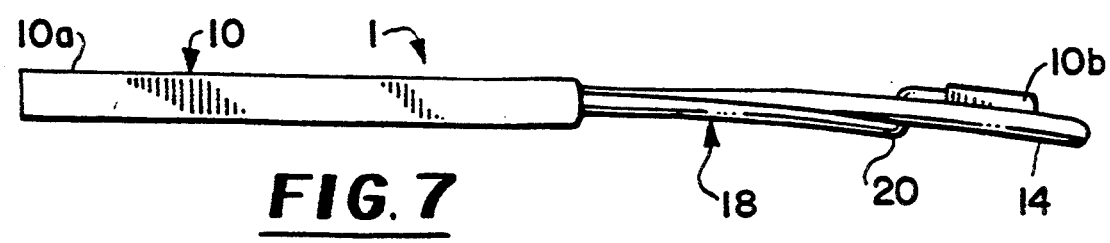
FIG. 7 is a top view of the dual temple system of FIG. 6.

FIGS. 5, 6, and 7 are directed to another embodiment of the present invention wherein paddle temple member 10 has a configuration specifically designed to define a recess or holding portion for securing cable temple member 14. Referring to FIGS. 5, 6 and 7, dual temple system 1 comprises paddle temple member 10 with a securing means described herein as a stepped portion 20 for receiving and securing cable temple member 14 by lifting and placing cable temple member 14 over stepped portion 20. Paddle temple member 10 can be integrally molded or shaped as a single member with stepped portion 20 (not shown) or a separate extension member 18 having outer end 10b, as shown, can be attached at or near central axis 4 to form the back portion of paddle temple member 10. Preferably, the paddle temple member 10 will have extension member 18 with an elongated "S" shape configuration (FIG. 7) defining the securing means to received temple member 14. Optionally, extension member 18 can have a separate ear member attached to extension member 18 to form outer end 10b, as shown, for comfort, fit and/or appearance.

FIGS. 1, 3, and 5 illustrate the dual temple system 1 wherein the cable temple member 14 is in a first position, the normal position for gripping the wearer's ear. FIGS. 2 and 4 illustrate the placement of cable temple member 14 into cradle 12 to place cable temple member 14 in a second position, the rest position removed or released from the ear. FIGS. 6 and 7 illustrate the placement of cable temple member 14 over and into stepped portion 20 of extension member 18 to place cable temple member 14 in the second position. In this second position, paddle temple member 10 will rest on the top of the wearer's ear and replace the cable temple member 14 as the means for attaching the eyewear to the head.

During normal use, the present invention provides a dual temple system which can be employed at the option of the wearer. The front frame containing at least one lens will be connected on each side to the dual temple system of the present invention. During active movement, typically any sporting activity such as skiing, snowboarding, bicycling or the like, the wearer can place cable temple member 14, in the first position, to attach securely around the ear. In this position, the eyewear is firmly secured to the wearer's head and will not be moved or dislodged during rapid movement. During rest, the wearer can easily and simply move cable temple member 14 to a second position by placing cable temple member 14 into cradle 12 or stepped portion 20 to remove cable temple member 14 from and secured it away from the ear. During the second position, paddle temple member 10 will rest on the wearer's ear to hold the eyewear comfortably in place.

The present invention is not limited by the Figures set forth herein and the embodiments specifically disclosed therein. It should be understood that the scope of this invention includes all modifications, variations and equivalents which fall within the scope of the attached claims.

What is claimed:

1. An eyewear temple system comprising
   a substantially rigid paddle temple member having an inner end for attachment to an eyewear front frame and an outer end proximate to said inner end passing over the ear of the wearer and extending behind the ear and having a sidewardly extending cradle between said inner end and said outer end, and
   a flexible cable temple member attached to said paddle temple member between said inner end and said cradle and having a generally arcuate Shape for gripping the ear when in a first position,
   whereby said cable temple member can be moved from said first position to a second position which does not contact the ear by placing said cable temple member into said cradle.

2. The temple system of claim 1 wherein said paddle temple member is selected from a molded polyamide, polycarbonate, and cellulose polymer or copolymer.

3. The temple system of claim 2 wherein said cradle is integrally molded along said outer end.

4. The temple system of claim 3 wherein said cable temple member is attached at a position under said paddle temple member.

5. An eyewear frame comprised of a front frame with means for holding at least one lens, a pair of temples rearwardly extending from said front frame on opposite sides thereof and a pair of hinge means for attaching the temples to the front frame, wherein said temples each comprise the temple system of claim 1.

6. The eyewear attachment system of claim 1 wherein said flexible member can be placed within said securing means without moving said flexible member horizontally toward said inner end.

7. An eyewear attachment system comprising
   a substantially rigid temple member having an inner end for attachment to a front frame and an outer end which rests upon the ear of the wearer of the eyewear and extends behind the ear and having an outer face to be positioned away from the wearer's head, said temple member having a generally U-shaped securing means on said outer face between said inner end and said outer end, and
   said U-shaped securing means adapted to removably receive said flexible member,
   a generally arcuately shaped flexible member attached to said temple member and extending from said temple member toward said outer end from a point between said inner end and said securing means,
   whereby said flexible member can be moved from a first position which grips the ear to a second position which releases the ear by placing said flexible member into said securing means.

8. The eyewear attachment system of claim 7 wherein said flexible member is comprised of a molded plastic.

9. The eyewear attachment system of claim 7 wherein said flexible member comprises a wound metal assembly.

10. The eyewear attachment system of claim 7 wherein said rigid temple member is selected from a polyamide, polycarbonate, and cellulose polymer or copolymer.

11. An eyewear temple system comprising
    a substantially rigid paddle temple member having an inner end which attaches to a front frame and an outer end which extends over and behind the ear of the wearer, said paddle temple member having a stepped portion between said inner end and said outer end, and
    a flexible cable temple member attached to said paddle temple member between said stepped portion and said inner end;
    said stepped portion having releasable means for receiving and holding said cable temple member thereon;
    whereby said cable temple member can be moved for a first position which grips the ear of the wearer to a second position which is removed from the ear by placing said cable temple member over said stepped portion of said paddle temple member.

12. An eyewear frame comprising a front frame for holding at least one lens, a pair of temples, and a pair of hinge means for connecting said temples to opposite sides of said front frame, wherein said temple means comprise
    a substantially rigid paddle temple member having an inner end for attachment to said front frame and an outer end proximate to said inner end passing over and extending behind the ear of the wearer and having a cradle between said inner end and said outer end, and
    a flexible cable temple member integrally molded to said paddle temple member between said inner end and said cradle and having a generally arcuate shape for gripping the wearer's ear when in a first position and movable therefrom to a second position which does not contact the ear by placing said cable temple member into said cradle.

13. In a sunglass having a pair of temples attached to a front frame, the improvement wherein said temples comprise a substantially rigid temple means having an end which passes over the ear of the wearer, a flexible temple means attached to said rigid temple means at a substantially central position thereon, and a securing means having a sidewardly extending generally U-shaped receiving means for removably receiving such flexible temple means located on an outer surface of said rigid temple means between said flexible temple means and said end wherein said flexible temple means can be moved from a first position gripping the ear to a second position removed from the ear by placing said flexible temple means into said securing means.

14. The sunglass of claim 13 wherein said securing means is a cradle integrally molded on said substantially rigid temple means to receive said flexible temple means therein.

15. The sunglass of claim 13 wherein said substantially rigid temple means has an elongated "S" shape with the central curved portion of said "S" shape defining said securing means.

* * * * *